US008794117B2

(12) United States Patent
Downing et al.

(10) Patent No.: US 8,794,117 B2
(45) Date of Patent: Aug. 5, 2014

(54) APPARATUS FOR CUTTING ELASTOMERIC MATERIALS

(75) Inventors: Daniel Ray Downing, Hartville, OH (US); David Michael Dejacimo, Louisville, OH (US); Dennis Alan Lundell, Akron, OH (US); Steven Leonard Kitz, Tallmadge, OH (US); Mark Alan Thompson, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 899 days.

(21) Appl. No.: 12/406,134

(22) Filed: Mar. 18, 2009

(65) Prior Publication Data
US 2009/0173199 A1 Jul. 9, 2009

Related U.S. Application Data

(63) Continuation of application No. 11/176,160, filed on Jul. 7, 2005, now abandoned.

(60) Provisional application No. 60/615,092, filed on Oct. 1, 2004.

(51) Int. Cl.
*B26D 7/14* (2006.01)
*B29D 30/46* (2006.01)

(52) U.S. Cl.
USPC ............................................. 83/453; 83/951

(58) Field of Classification Search
USPC ........... 83/951, 456, 557, 561, 658, 401, 452, 83/453, 461, 51, 52, 418, 422, 175, 282, 83/956
See application file for complete search history.

(56) References Cited

U.S. PATENT DOCUMENTS

| | | | |
|---|---|---|---|
| 3,232,159 A * | 2/1966 | Stanley | 83/175 |
| 3,895,990 A | 7/1975 | Josteit et al. | 156/304 |
| 4,516,451 A | 5/1985 | Takeshita et al. | 83/171 |
| 4,560,427 A | 12/1985 | Flood | 156/73.3 |
| 4,610,750 A | 9/1986 | Mango | 156/510 |
| 4,867,434 A | 9/1989 | Okuyama et al. | 271/42 |
| 4,920,495 A | 4/1990 | Pilkington | 83/956 |

(Continued)

FOREIGN PATENT DOCUMENTS

| | | | |
|---|---|---|---|
| DE | 28 05 870 | 8/1979 | B29H 17/30 |
| EP | 0 444 573 A1 | 9/1991 | B29D 30/46 |

(Continued)

*Primary Examiner* — Stephen Choi
(74) *Attorney, Agent, or Firm* — June E. Rickey

(57) ABSTRACT

A method and apparatus is provided for cutting an elastomeric laminate that may include a layer of reinforcement cords, into a desired length without cutting through the cords. The method includes the step of cutting through the gum portion of the elastomeric composite material at a desired skive angle, and then opening up the skived cut. Next, the cord reinforcement layer is cut without severing the reinforcement cords. An elastomeric composite strip cut to the desired length is produced and has cut ends. One of the cut ends has the gum portion cut at a desired skive angle adjacent an overhang portion of the reinforcement layer. The opposite end of the elastomeric composite segment also has a skived portion to mate with the skived portion of the first cut end, and a gap in the cord ply to mate with the cord overhang of the first end, resulting in a splice. An improved anvil having independently controlled vacuum zones is also provided, as well as improved cutting mechanisms.

4 Claims, 22 Drawing Sheets

(56) References Cited

U.S. PATENT DOCUMENTS

| | | | |
|---|---|---|---|
| 4,922,774 A | 5/1990 | Oldeman | 83/175 |
| 4,987,808 A | 1/1991 | Sicka et al. | 83/175 |
| 5,265,508 A | 11/1993 | Bell et al. | 83/136 |
| 5,273,601 A | 12/1993 | Sergel et al. | 156/133 |
| 5,350,470 A | 9/1994 | Mochel et al. | 156/136 |
| 5,480,508 A | 1/1996 | Manabe et al. | 156/353 |
| 5,638,732 A | 6/1997 | Becker et al. | 83/461 |
| 5,746,101 A | 5/1998 | Benzing, II et al. | 83/34 |
| 5,762,740 A | 6/1998 | Benzing, II | 156/133 |
| 6,302,602 B1 * | 10/2001 | Kiyohara et al. | 400/593 |
| 6,592,704 B1 | 7/2003 | Benzing, II | 83/51 |
| 6,755,105 B2 | 6/2004 | Downing | 83/175 |
| 6,790,301 B2 | 9/2004 | Risser et al. | 156/73.3 |
| 7,455,002 B2 | 11/2008 | Downing | 83/20 |
| 7,526,986 B2 * | 5/2009 | Downing | 83/13 |

FOREIGN PATENT DOCUMENTS

| | | | |
|---|---|---|---|
| EP | 1 262 288 | 12/2002 | B26D 7/08 |
| WO | WO 00/23261 | 4/2000 | B29D 30/46 |
| WO | WO 00/51810 | 9/2000 | B29D 30/46 |

* cited by examiner

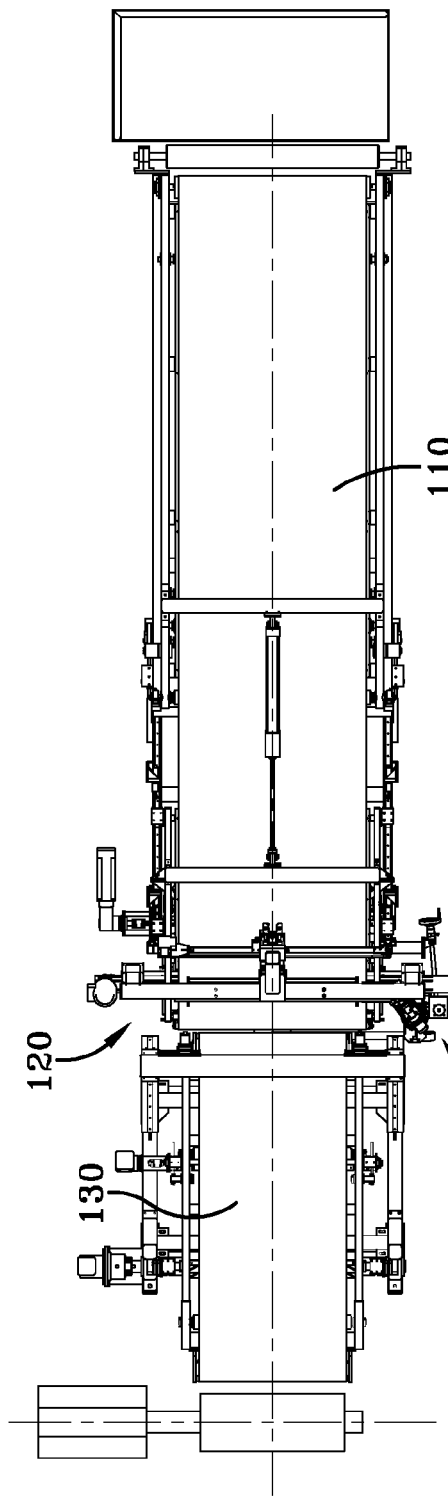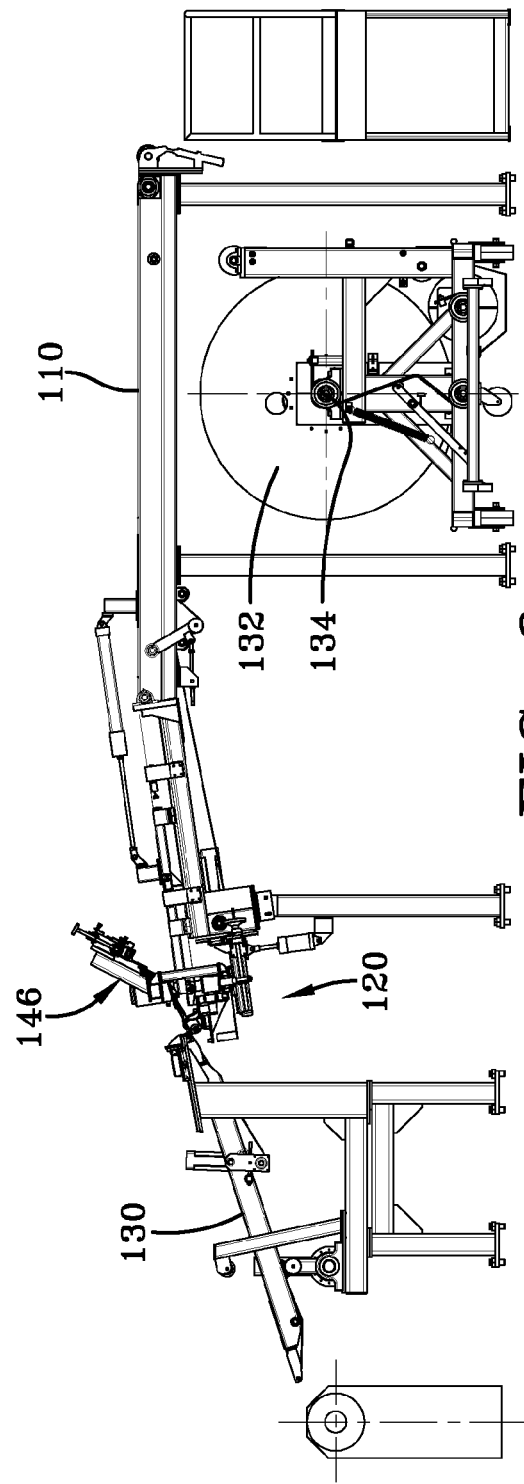

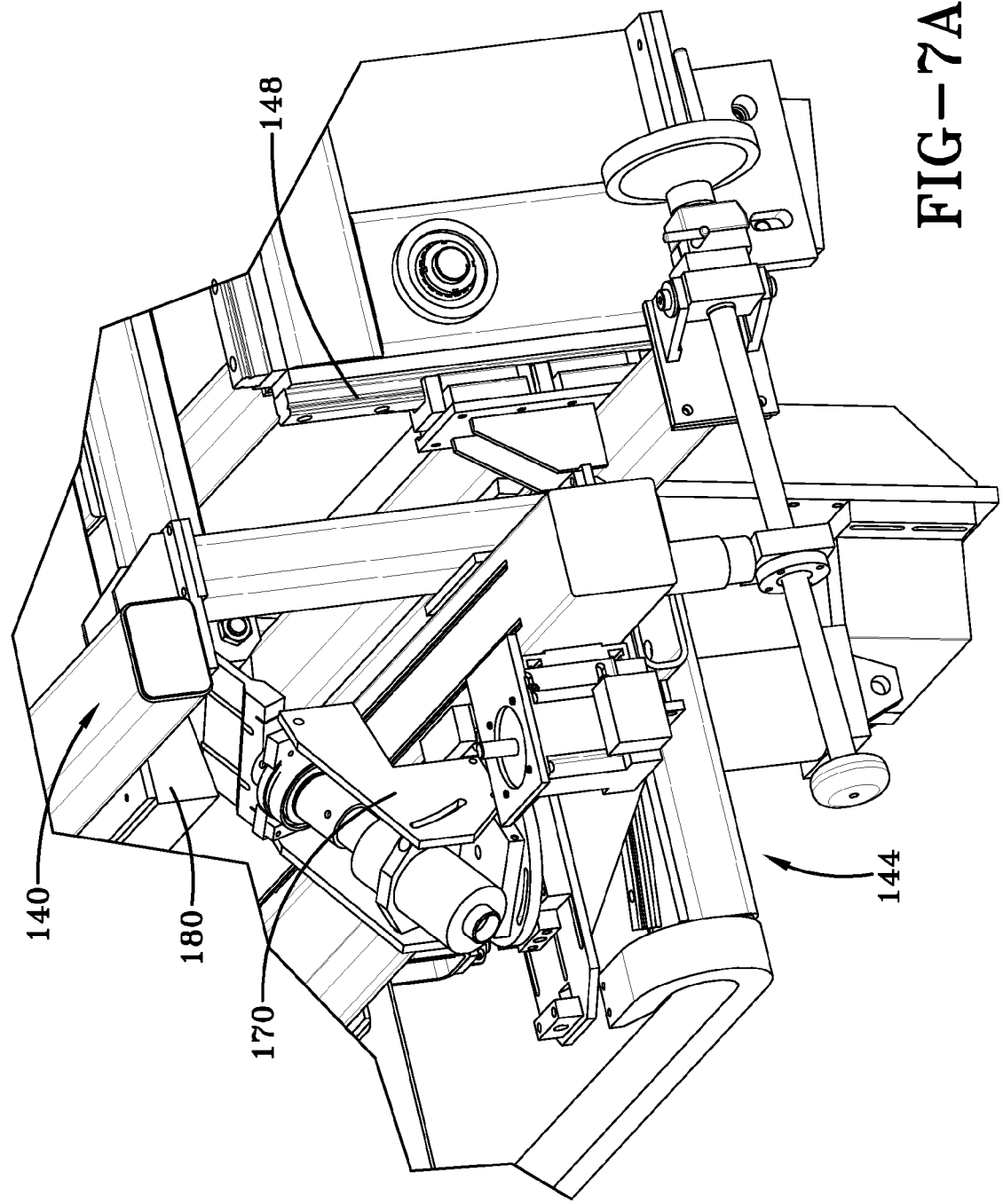

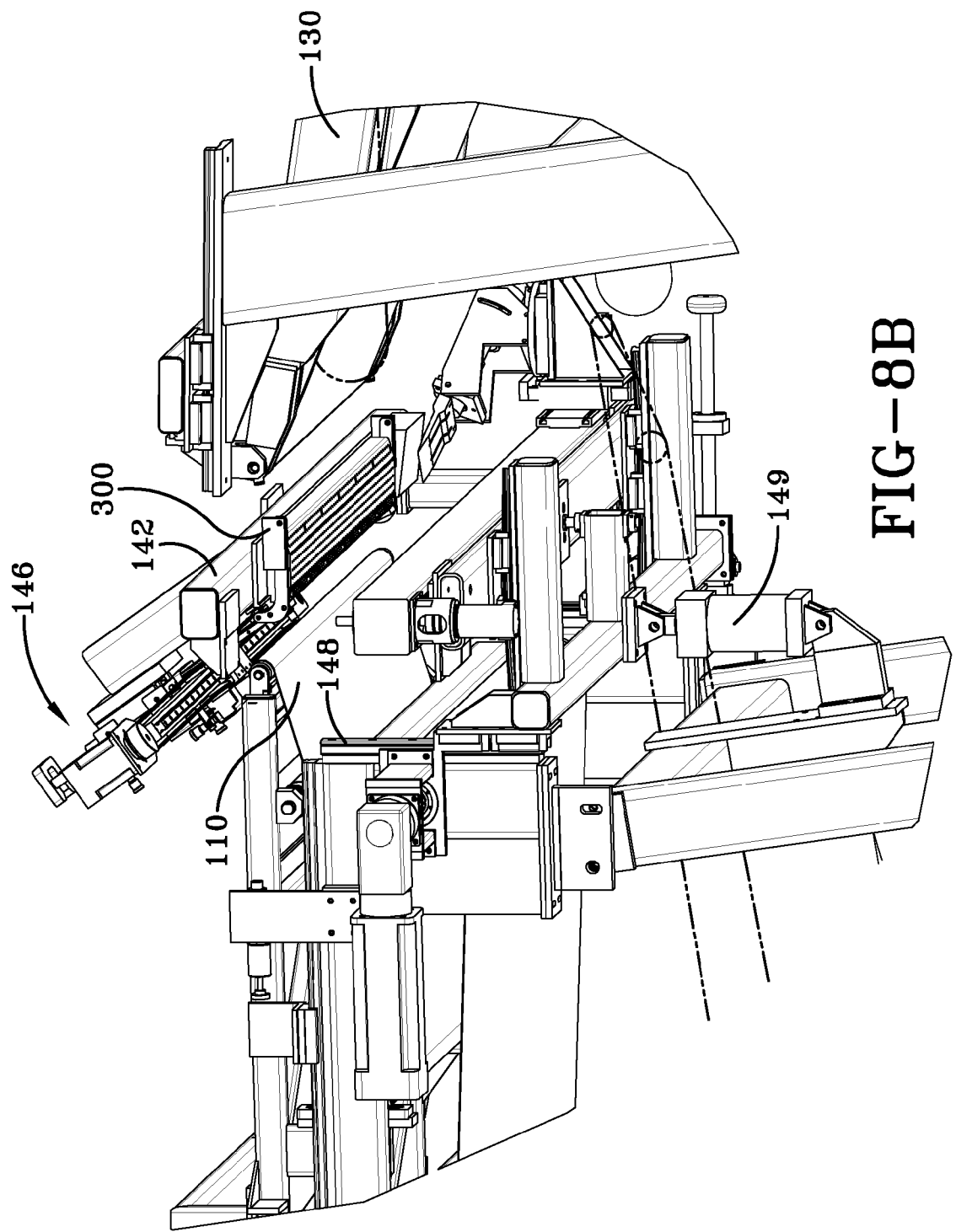

APPARATUS FOR CUTTING ELASTOMERIC MATERIALS

This application claims the benefit of 60/615,092 filed on Oct. 1, 2004, and is a continuation of application Ser. No. 11/176,160 filed on Jul. 7, 2005.

TECHNICAL FIELD

This invention relates to methods and apparati for cutting elastomeric materials at low skive angles, and cutting a multilayered elastomeric composite including one or more layers containing reinforcing materials.

BACKGROUND OF THE INVENTION

Historically, the pneumatic tire has been fabricated as a laminate structure of generally toroidal shape having beads, a tread, belt reinforcement and a carcass. The manufacturing technologies employed for the most part involve the successive assembling of multiple tire components onto a tire building drum wherein each tire component is cut to length and spliced on the drum. A typical tire may comprise about six splices spaced about the tire.

Recent advances in the first stage of tire subassembly construction involve the utilization of a single unvulcanized laminated structure, such as described in U.S. Pat. Nos. 5,762,740 and 5,746,101, which are hereby incorporated by reference. Instead of multiple tire components being applied to a tire building drum in a successive manner, a single laminate structure is cut to the appropriate length and then applied to the tire building drum, wherein the ends of the laminated structure are spliced together. It is desired then that the ends of the laminated structure be cut at a low skive angle, because it allows for a butt splice or a splice wherein a few cords overlap, resulting in a stronger splice.

If the laminate structure includes a reinforcement layer such as reinforced ply containing closely spaced reinforcement cords, it is an engineering challenge to be able to cut through the laminate structure to the desired length without cutting through any of the cords, especially at low skive angles. The cut must be made between the parallel-aligned reinforcing cords, without cutting through any of the reinforcement cords. This can be an extremely difficult task to accomplish, because the reinforcement cords are typically very closely spaced, on the order of 30 cords/in. An ideal cutting method and apparatus should also be able to make cuts at low angles relative to the plane of the elastomeric sheet being cut in a rapid and reliable manner.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 170 to 270 with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape.

Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the crescent- or wedge-shaped reinforcement typically used to reinforce the sidewalls of runflat-type tires; it also refers to the elastomeric non-crescent shaped insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Skive" or "skive angle" refers to the cutting angle of a knife with respect to the material being cut; the skive angle is measured with respect to the plane of the flat material being cut.

"Laminate structure" means an unvulcanized structure made of one or more layers of tire or elastomer components such as the innerliner, sidewalls, and optional ply layer.

BRIEF DESCRIPTION OF THE DRAWINGS

The structure, operation, and advantage of the invention will become further apparent upon consideration of the following description taken in conjunction with the accompanying drawings wherein:

FIG. 5 is a top view of the two stage cutter mechanism of FIG. 4;

FIG. 6 is a side view of the two stage cutter mechanism of FIG. 4;

FIGS. 8a and 8b are close up views from the bottom of the cutting section of the two stage cutter mechanism, shown with and without laminate stock, respectively.

DETAILED DESCRIPTION OF THE INVENTION

Figure 1:
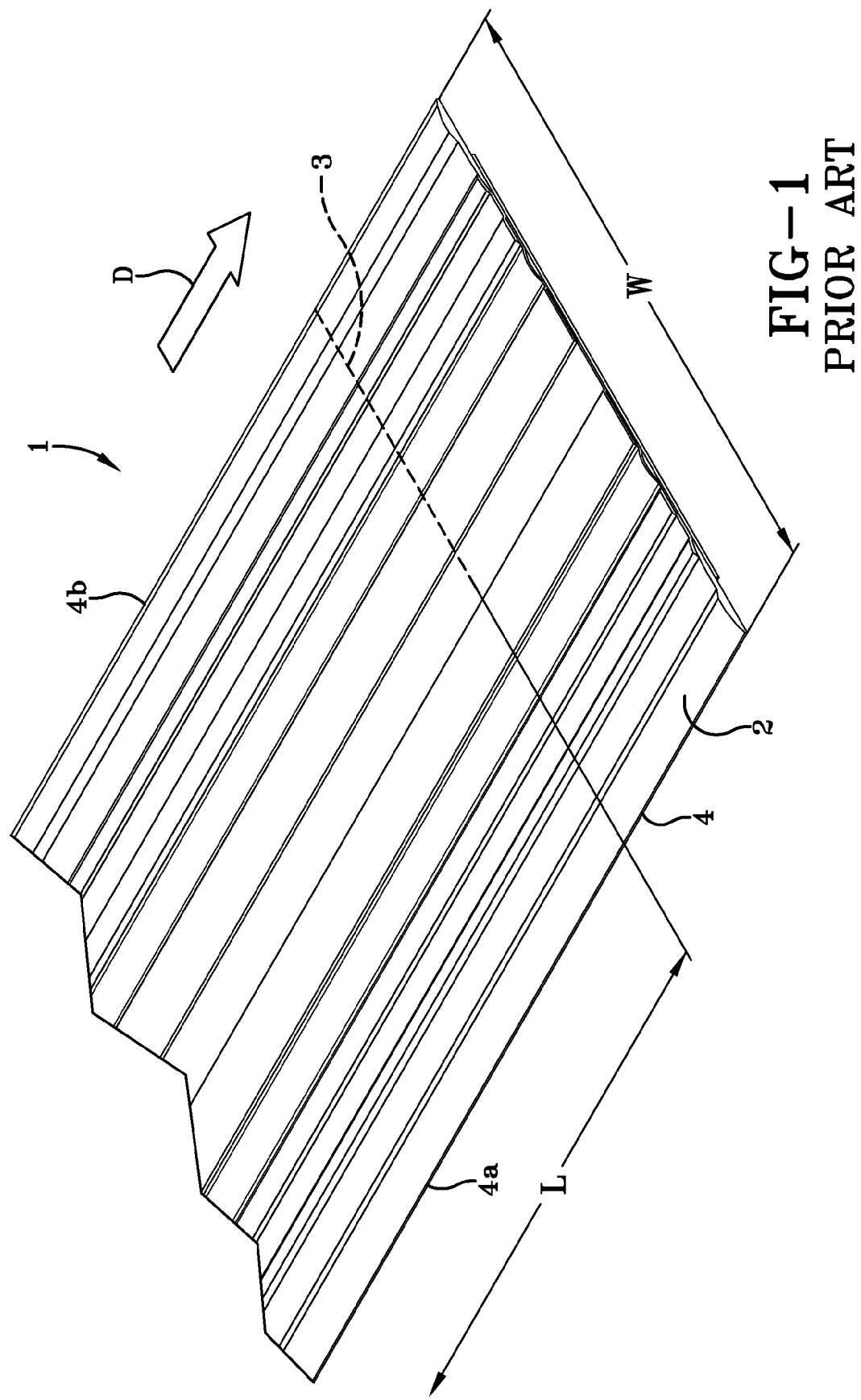
FIG. 1 is a schematic view of a multi-layer elastomeric composite strip, showing the location of the cut to be made.
Figure 2:
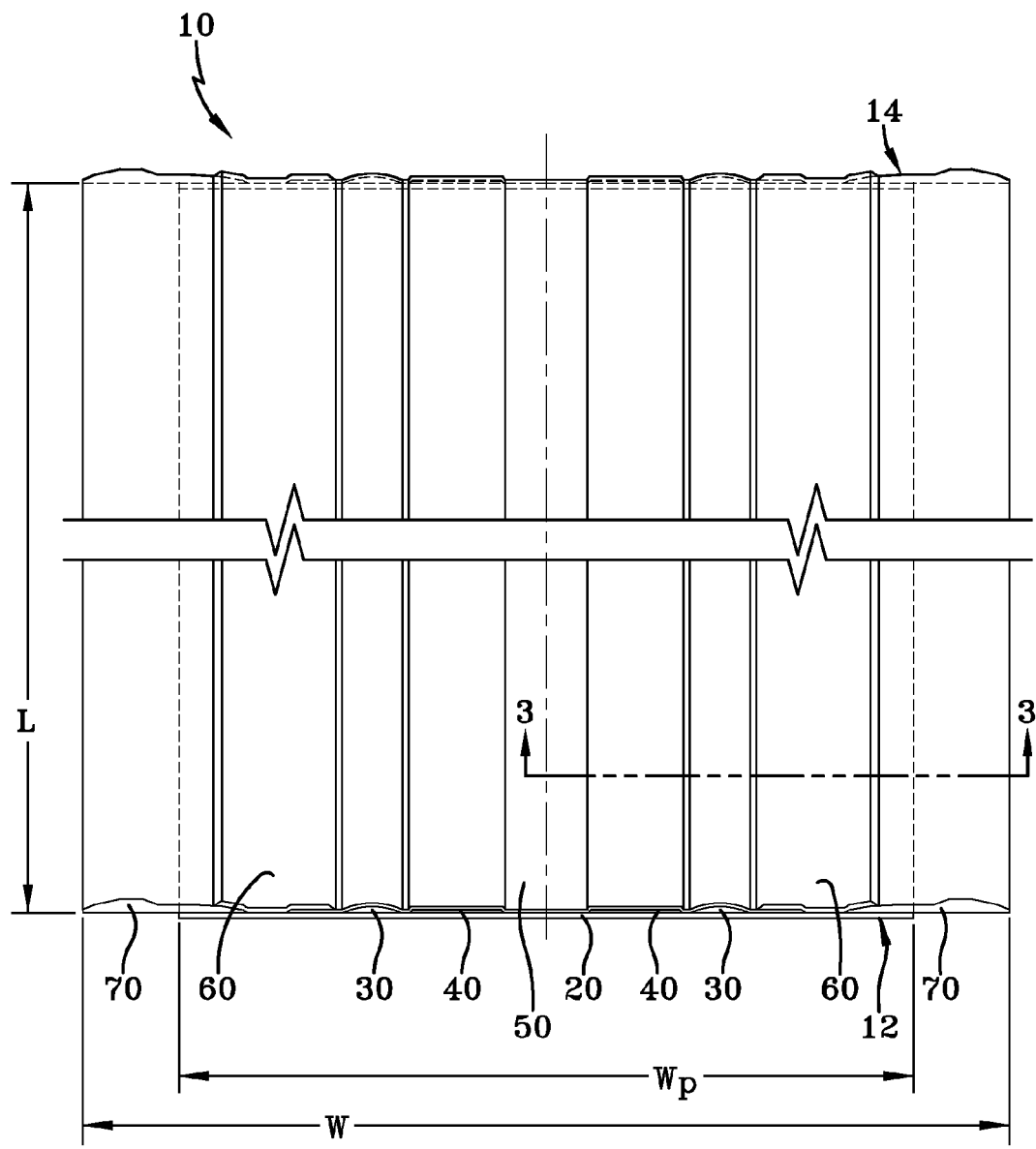
FIG. 2 is a top view of the multi-layer elastomeric composite of FIG. 1 cut to the desired length.
Figure 3:
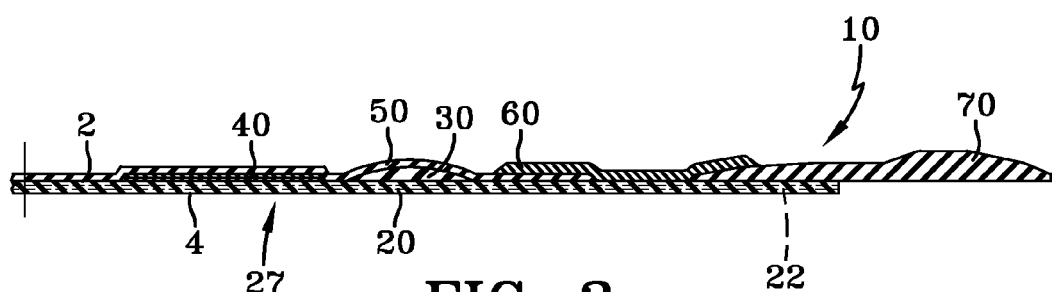
FIG. 3 is a cross sectional view in the direction 3-3 of FIG. 2.

A strip of elastomeric composite or laminate structure 1 to be cut by the method and apparatus of the invention is shown in FIGS. 1-3. However, the cutting apparati described herein are not limited to cutting laminate, as other materials such as ply or gum components may be used. The laminate 1 has a width W and an indefinite length designated by the L direction. The dotted line 3 shows the location or path of a lateral cut that is to be made across the width of the laminate 1. The path 3 can be perpendicular to the length L of the laminate or at an oblique angle across the width W. If the laminate 1 has one or more reinforcement layers of parallel cords 22 that are similarly oriented, then it is preferred that the cutting path 3 be oriented relative to the cord 22 path.

In the various figures shown, the laminate 1 may include various components used in the manufacture of tires. FIGS. 2 and 3 illustrate one example of a laminate 1 having an optional ply layer 20 comprised of cords 22 and having a width less than the laminate width W, inserts 30, shoulder gum strips 40, a liner 50, a pair of chaffer strips 60, and a pair of sidewall components 70. Without departing from the spirit of the invention, other components used in tire making may also be included.

Figure 4:
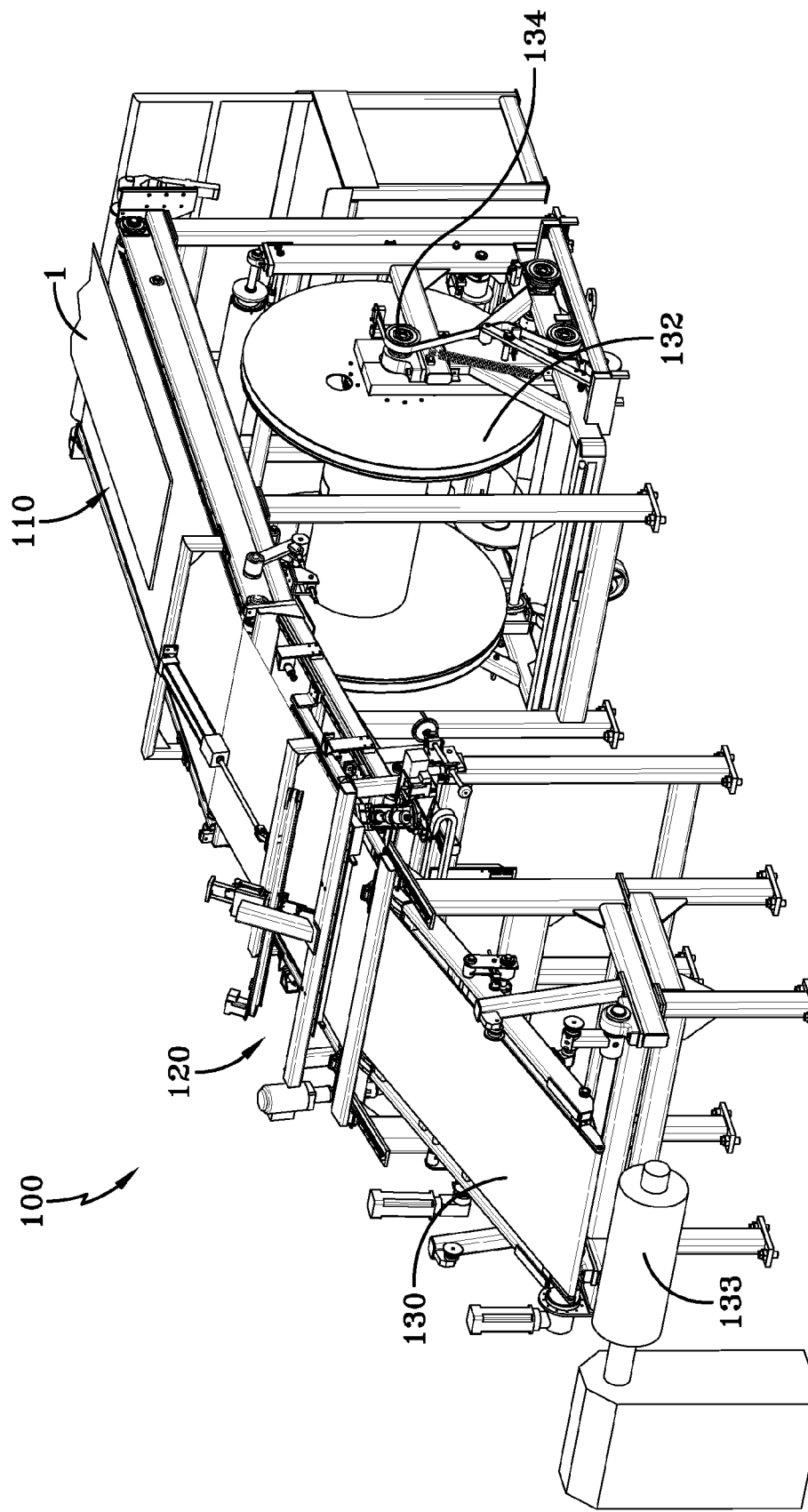
FIG. 4 is a perspective view of the two stage cutter mechanism of the present invention.

A first embodiment of a cutting device 100 of the invention is shown in FIGS. 4-6.

The cutting device 100 functions to cut the laminate into strips of a desired length so that each end is cut at a desired skive angle. The skived ends are then joined together, wherein a carcass for a radial ply pneumatic tire, such as described in more detail below. One advantage to the invention is that the resulting butt splice formed is very strong, and due to the fact that there is only one splice, a more stronger, uniform tire is formed.

The cutting device 100 may include an optional conveyor system, an anvil system, a gum cutter system and an optional ply cutter system, all of which are described in greater detail, below.

Conveyor System

Figure 7:
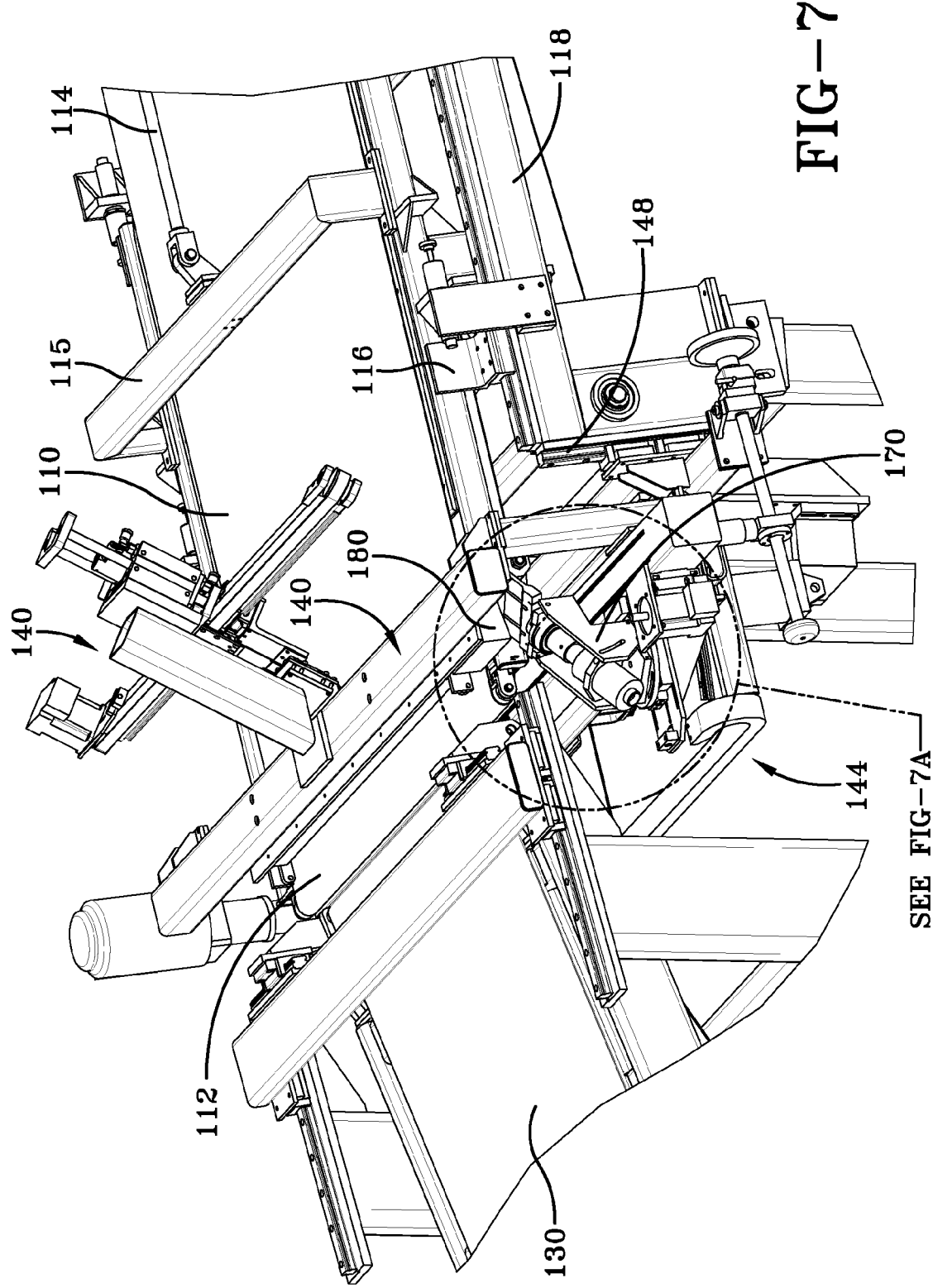
FIG. 7 is a close up, perspective view of the cutting section of the two stage cutter mechanism.

The laminate stock is typically mounted on a large roll 132 which may be rotatably mounted on a spindle 134 adjacent the feed conveyor belt 110. The laminate 1 is mounted so that the gum layers are face down on the conveyor belt, while the ply layer is face up. However, the invention is not limited to this configuration as the machinery could be reversed. As shown in FIG. 4, the cutting device 100 comprises a feed conveyor 110 for advancing the laminate stock 1 to the cutting section 120 of the cutting device 100. As best shown in FIG. 7, the feed conveyor 110 has a retractable nose 112 that translates away from the anvil prior to the cutting operation. The feed conveyor 110 has side supports 116 mounted in side rails 118 to allow the nose 112 of the feed conveyor to slide forward and aft, so that the nose is retracted out of the way of the cutter mechanism so that it can translate downward, as shown in FIG. 8. Actuator arm 114 connected to the top mounted rail 115 of feed conveyor 110 retracts in order to move the nose of the conveyor.

After the laminate has been cut, a downstream conveyor 130 transports the laminate strip away from the cutting device 100, generally towards a tire building drum 133. The conveyor system 110,130 may further include a length sensor (not shown) located on or adjacent the second conveyor belt, which communicates with a control system 200 (not shown) to advance the laminate past the cutting line on the anvil of the cutting device 100 until the desired length to be cut has been reached.

Anvil Assembly

The anvil assembly 140 comprises a rectangular shaped bar having a length suitable for cutting across the width of the laminate. The longitudinal axis of the anvil may be oriented at a ninety degree angle to the width of the laminate. Although not required, both the anvil 142 and the first and second stage cutting devices 144,146 (collectively, the cutter system) may be slidably mounted on vertical side rails 148 so that the cutter system 144,146 can translate downward until the lower surface of the anvil 142 contacts the laminate, after the nose of the feed conveyor system has translated away from the anvil. Hydraulic cylinder 149 moves the cutter system up and down the tracks of support rails 148.

Figure 9:
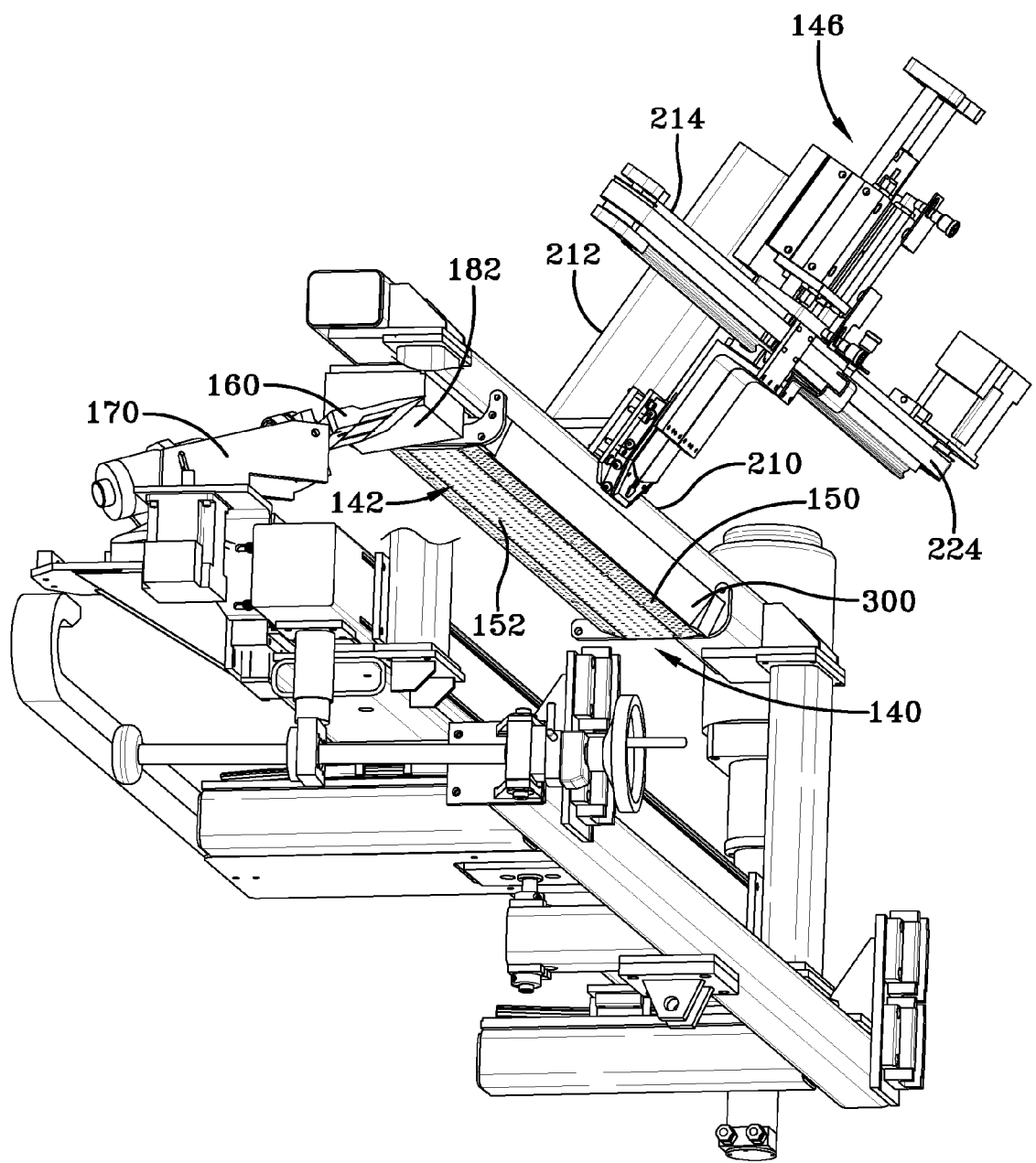
FIG. 9 is a close up view from the bottom of the cutting section of the two stage cutter mechanism, shown with support brackets and the like removed for clarity.
Figure 13:
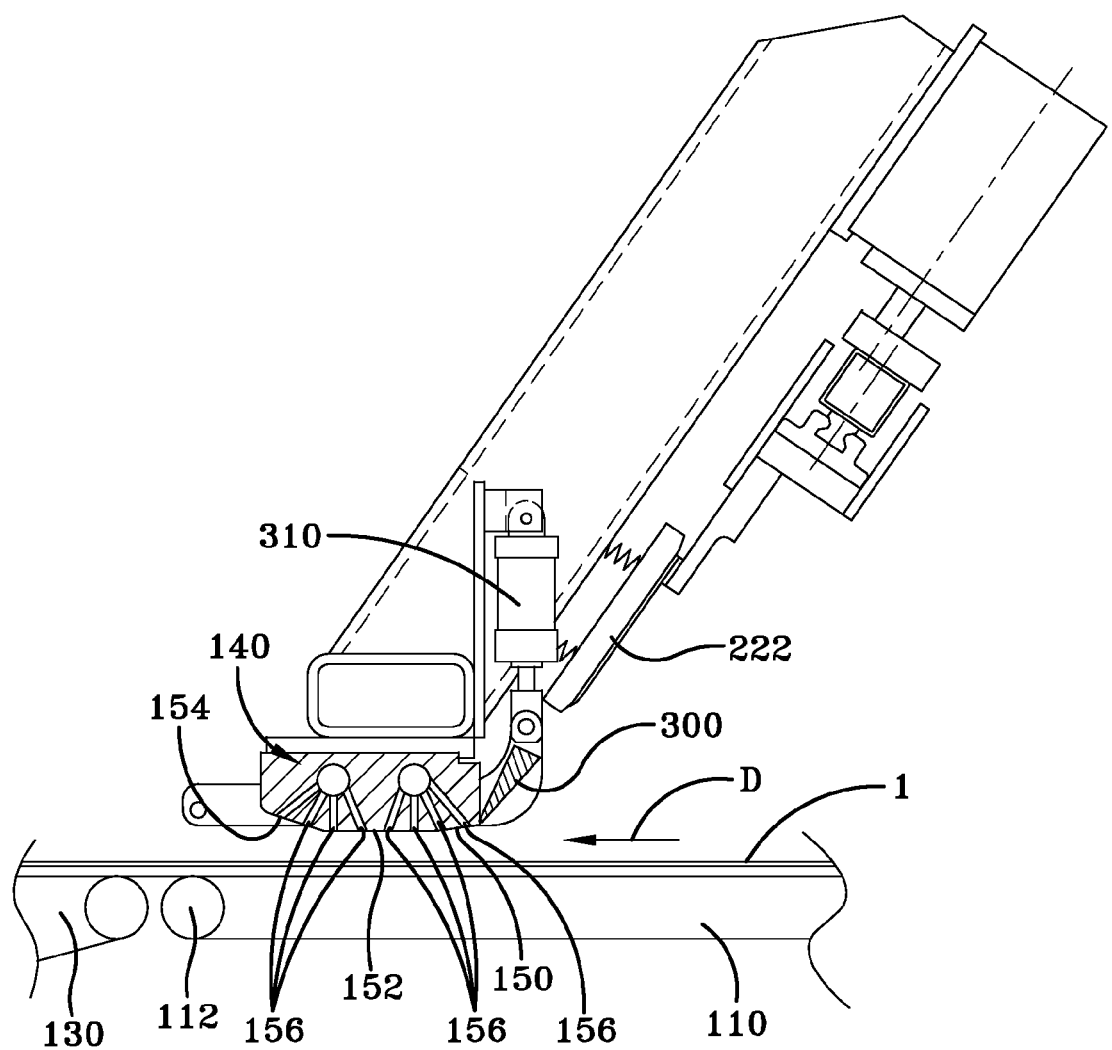
FIGS. 13-19 are side views of the first and second stage cutting system progressively illustrating each step of the first and second stage cutting operation.
Figure 14:
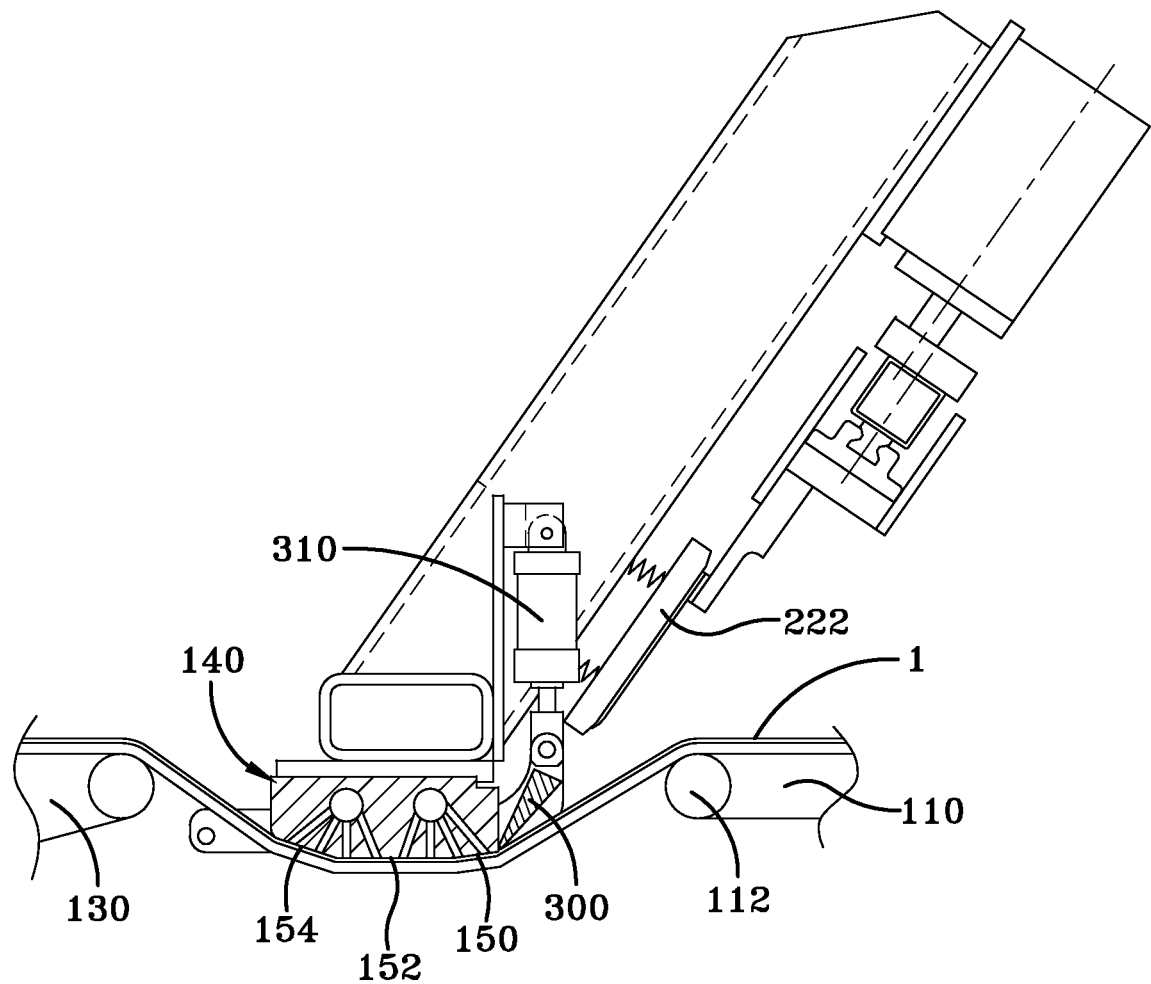
Figure 15:
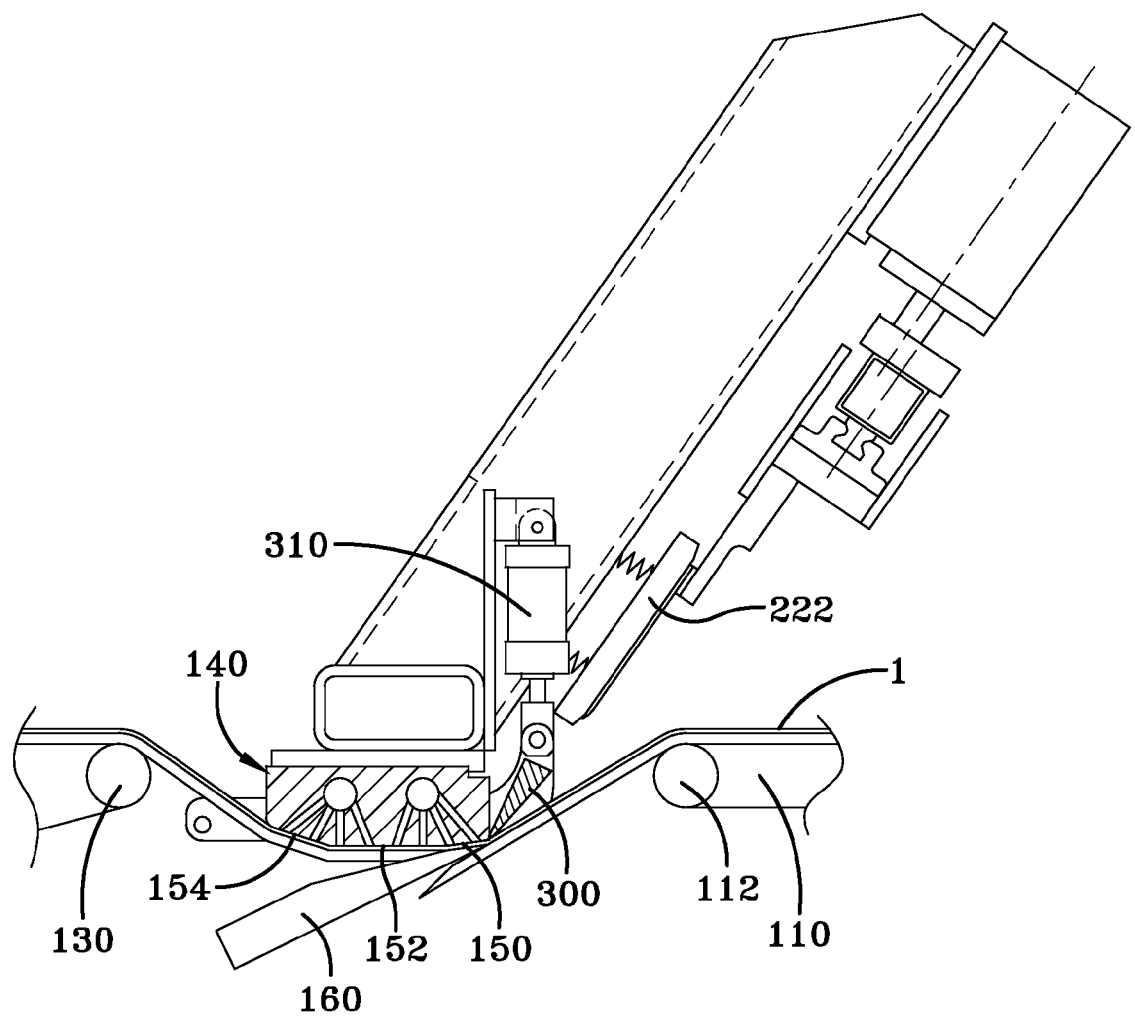
Figure 16:
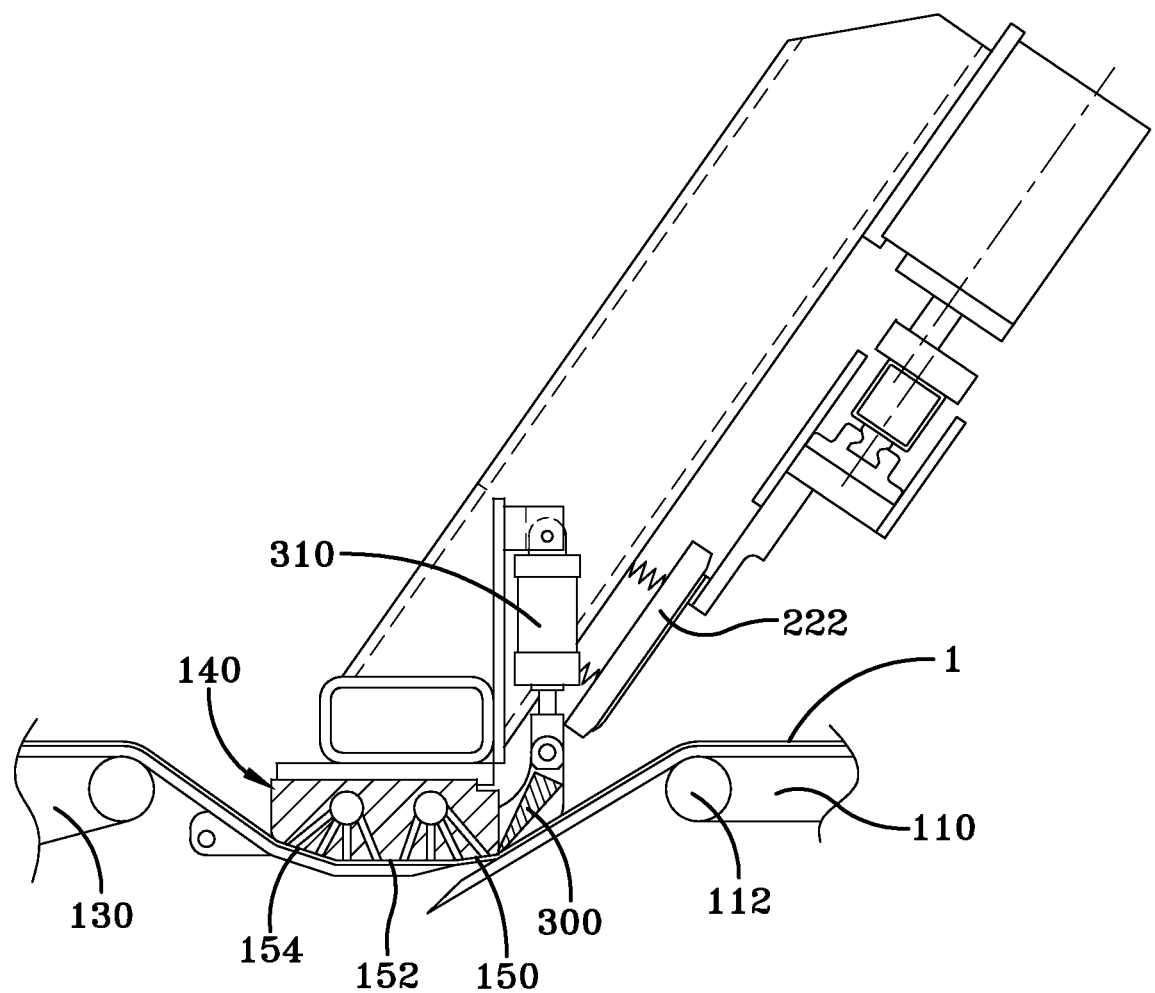
Figure 17:
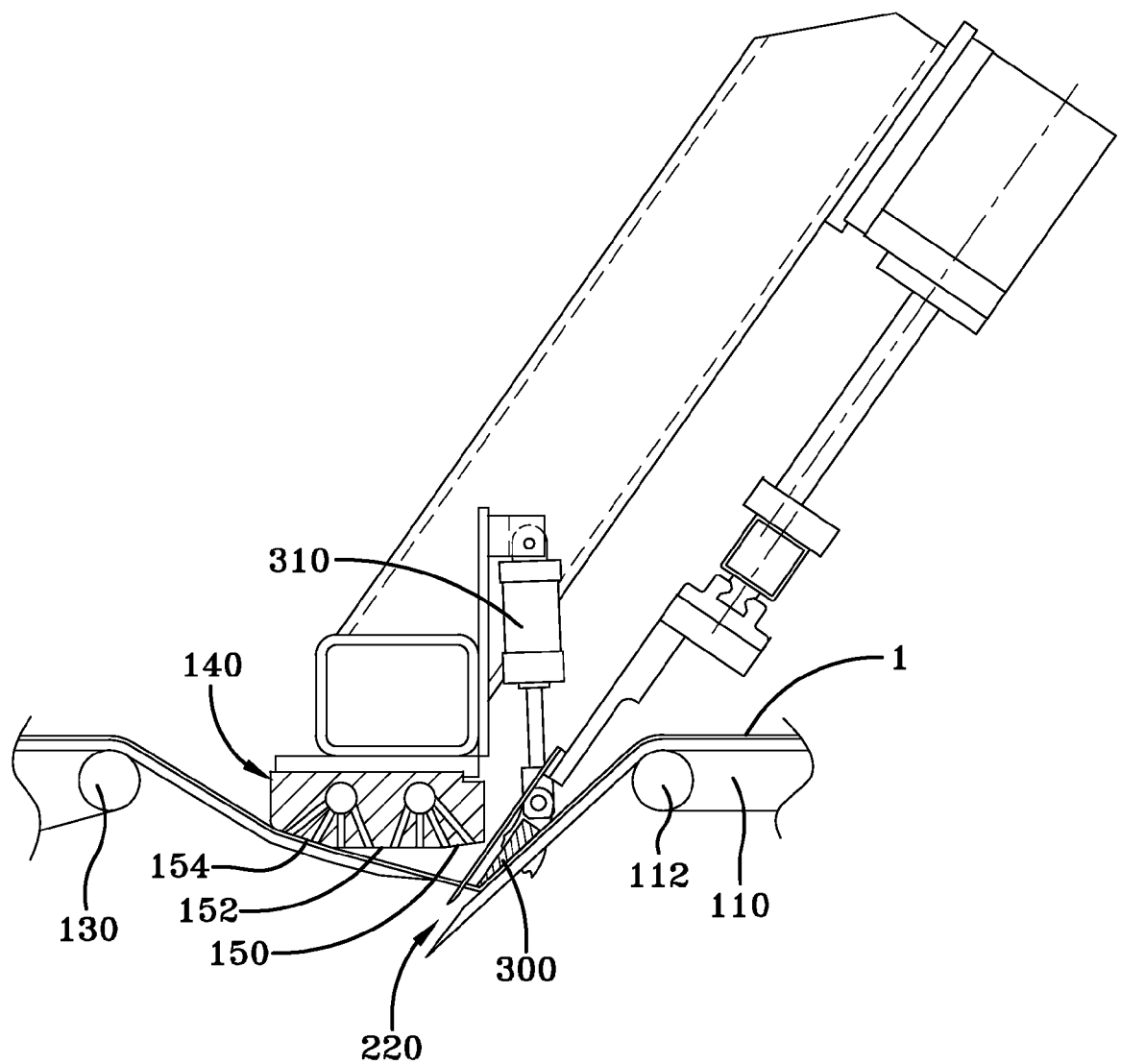
Figure 18:
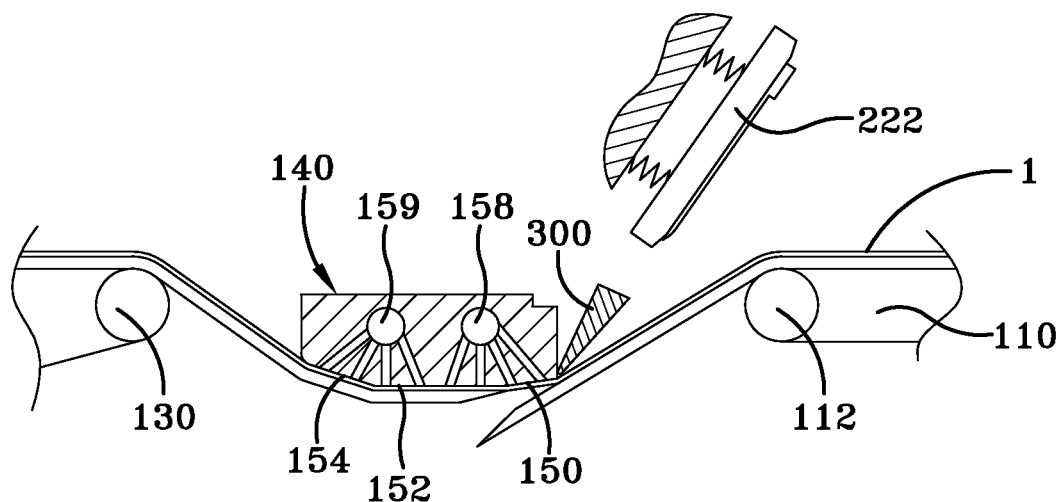
Figure 19:
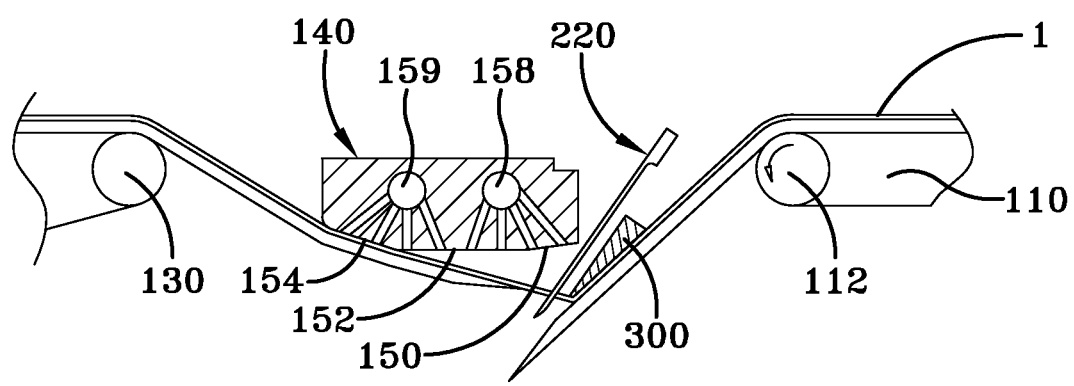

The anvil lower surface is divided into three sections. The leading edge section 150 is angled at angle, typically a desired skive angle, in the range of about 3-8 degrees. As shown in FIGS. 9 and 13, the anvil lower surface has a middle section 152 that may be flat or slightly angled, and a third or rear section 154 that is angled typically in the range of about 5 to about 15 degrees.

Figure 21:
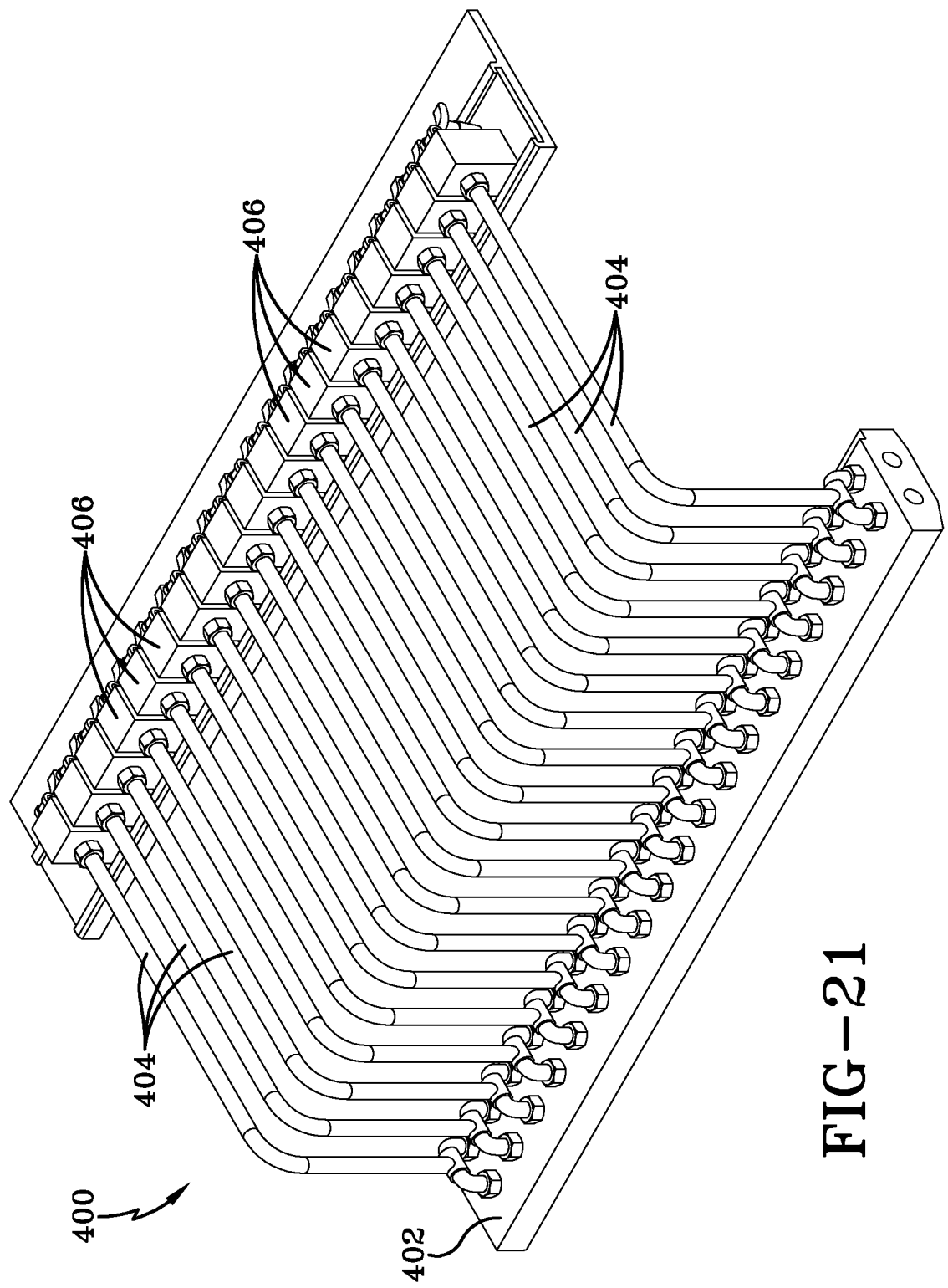
FIG. 21 is an embodiment of an anvil with a zoned vacuum system.

Each of the three anvil sections has a plurality of closely spaced vacuum holes 156 connected to one or more sources of vacuum. One or more rows of vacuum holes that are perpendicular to the longitudinal axis of the anvil may be each grouped into a zone, wherein each zone has an independently controlled vacuum source. One way to accomplish this is the anvil has interior segmented cavities, wherein each cavity is connected to a row of vacuum holes at the anvil surface and its own independently controlled vacuum line. See FIG. 21. Utilizing independently controlled zones allows for the adjustment of the laminate stock width so that suction is not lost because of holes that are not in contact with the laminate.

It may also be desired to have independent control of the vacuum holes in each of the sections 150,152,154 so that the vacuum of each of the sections may be turned on or off, independent of each other.

First Stage Cutting System

Figure 10:
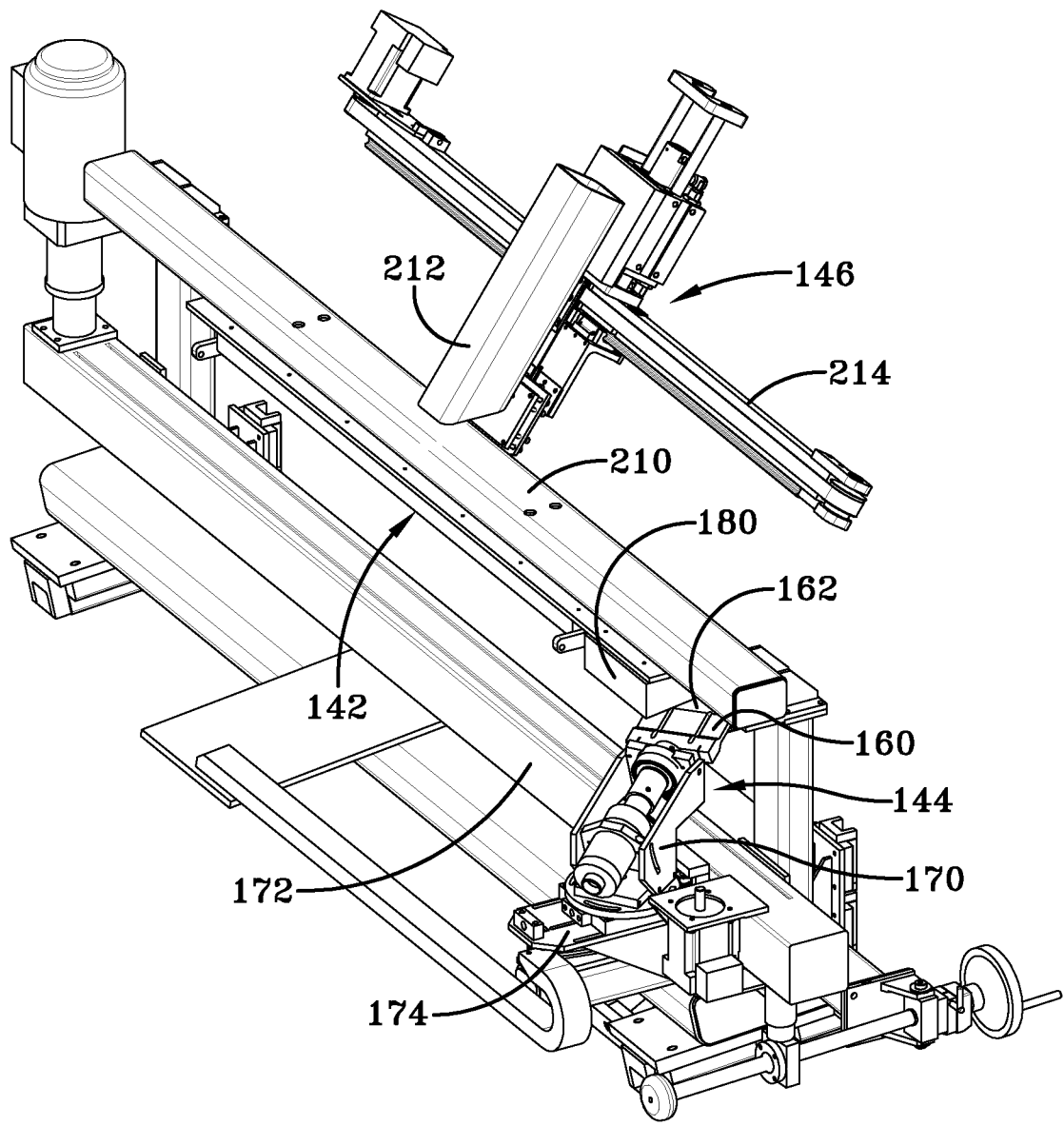
FIG. 10 is a front view of the two stage cutter mechanism of FIG. 9.
Figure 11:
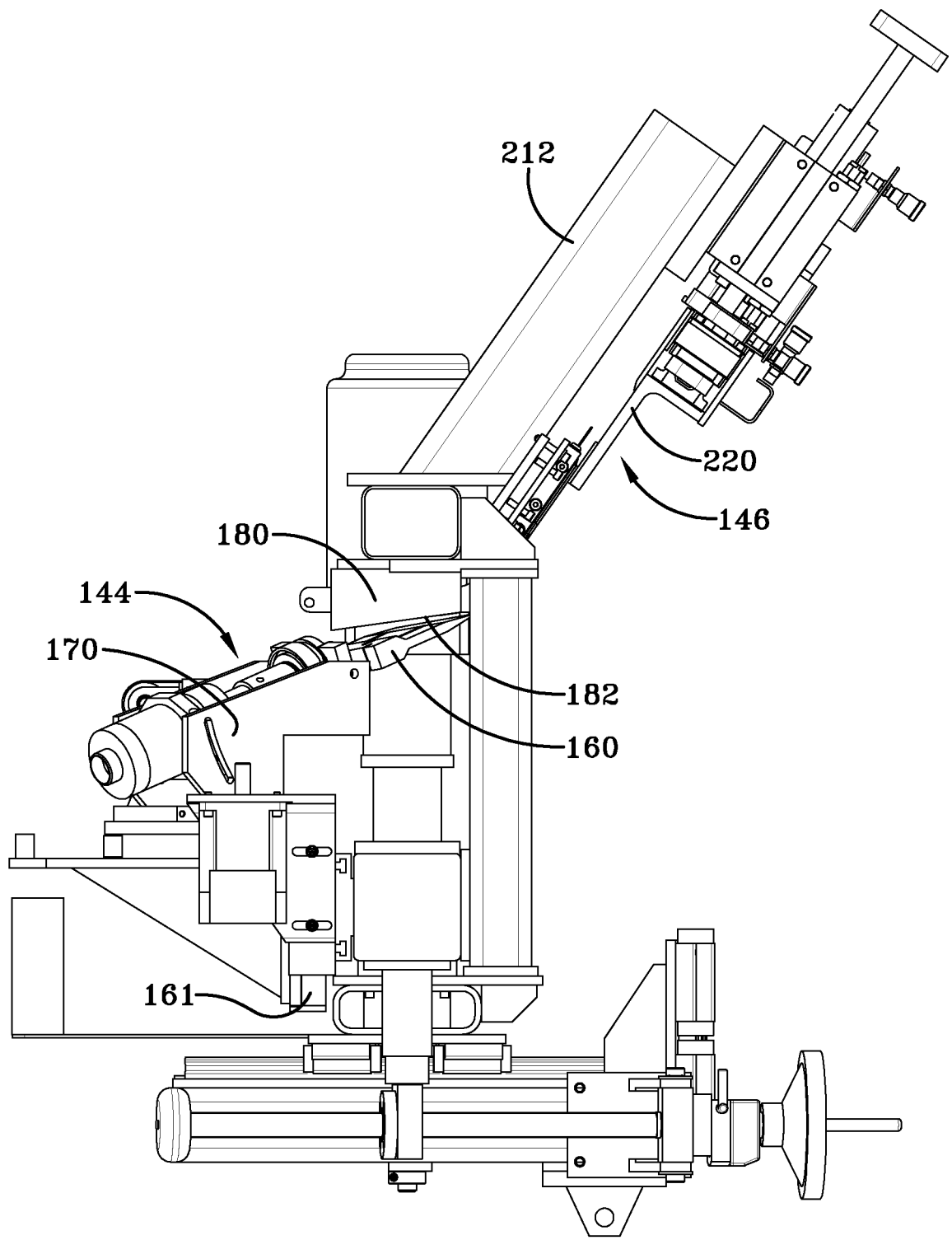
FIG. 11 is a view from the right of the two stage cutter mechanism of FIG. 10.
Figure 12:
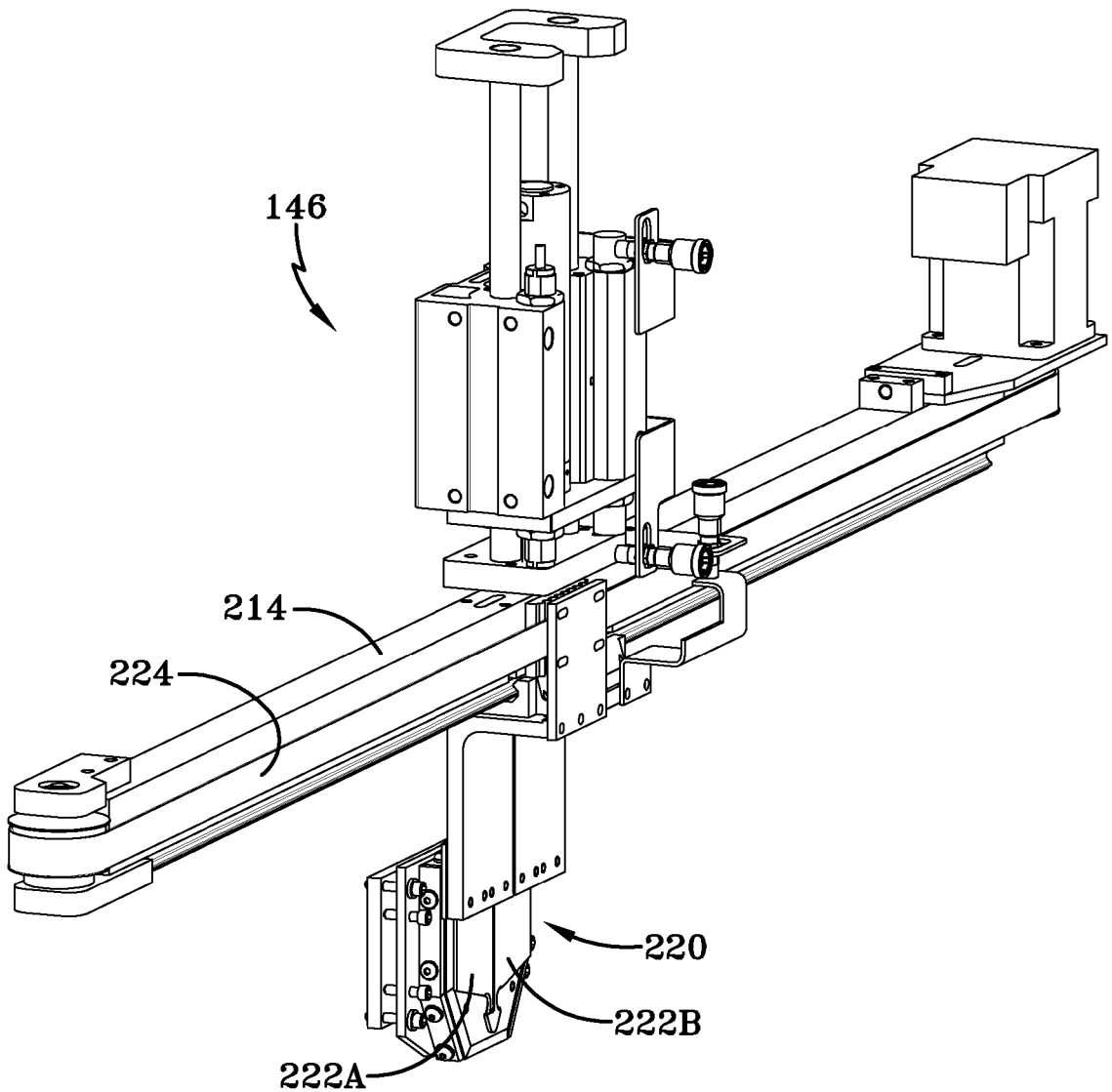
FIG. 12 is a perspective view of only the second stage cutting system.
Figure 22:
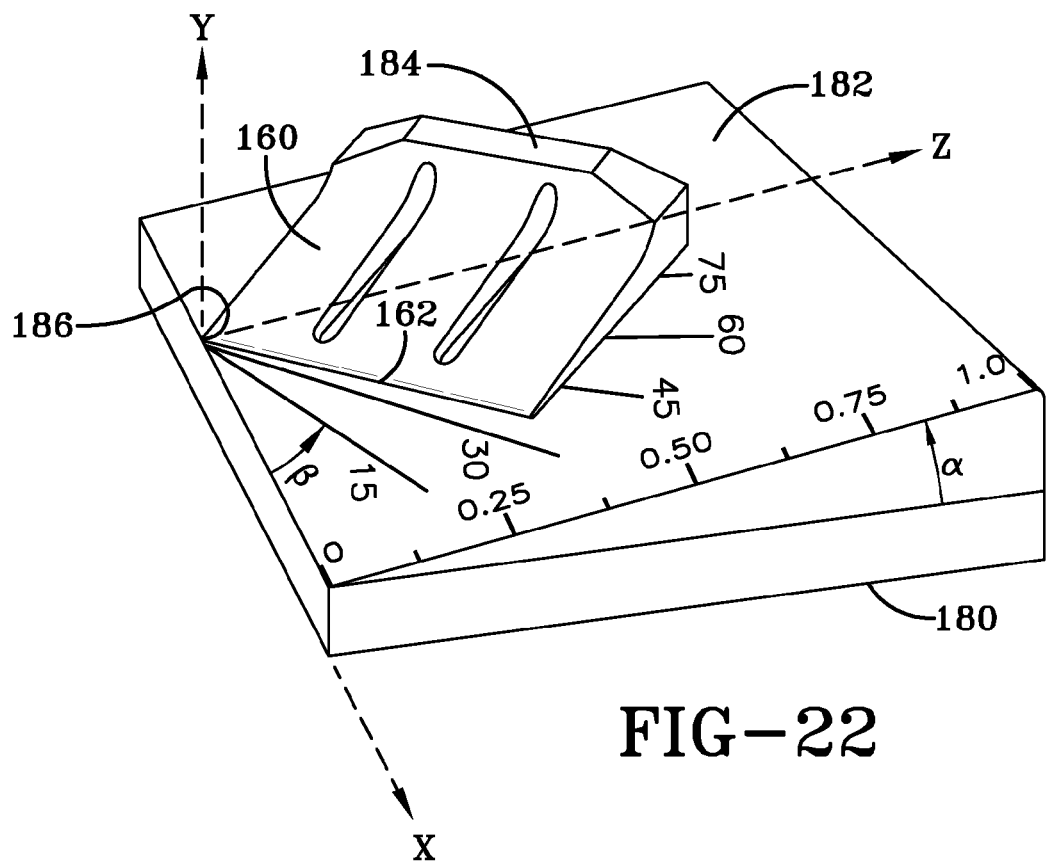
FIG. 22 is a side view of a calibration block of the present invention.
Figure 23:
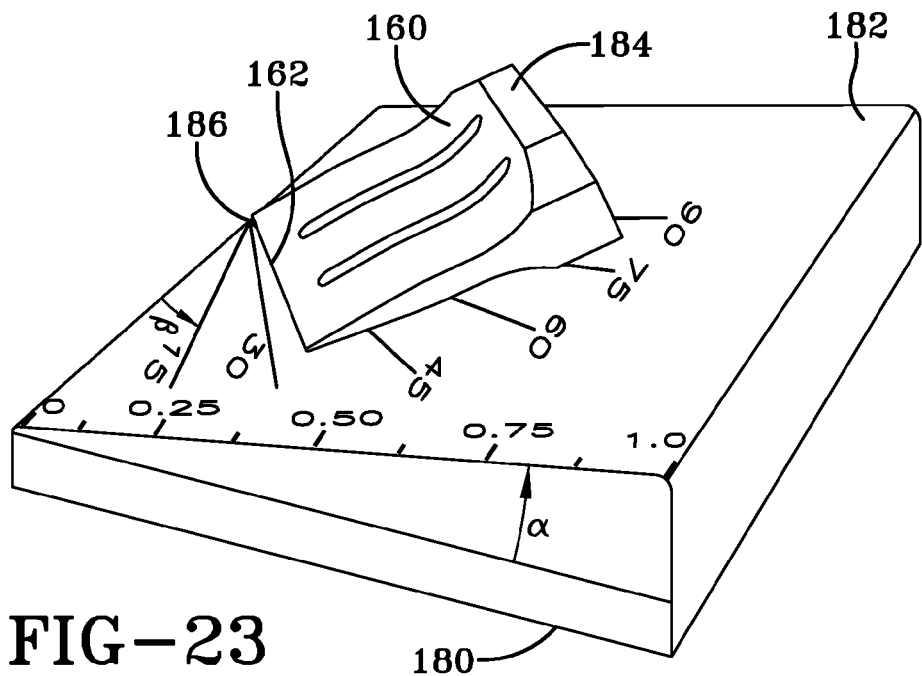
FIG. 23 is a rear perspective view of the calibration block of FIG. 22.
Figure 24:
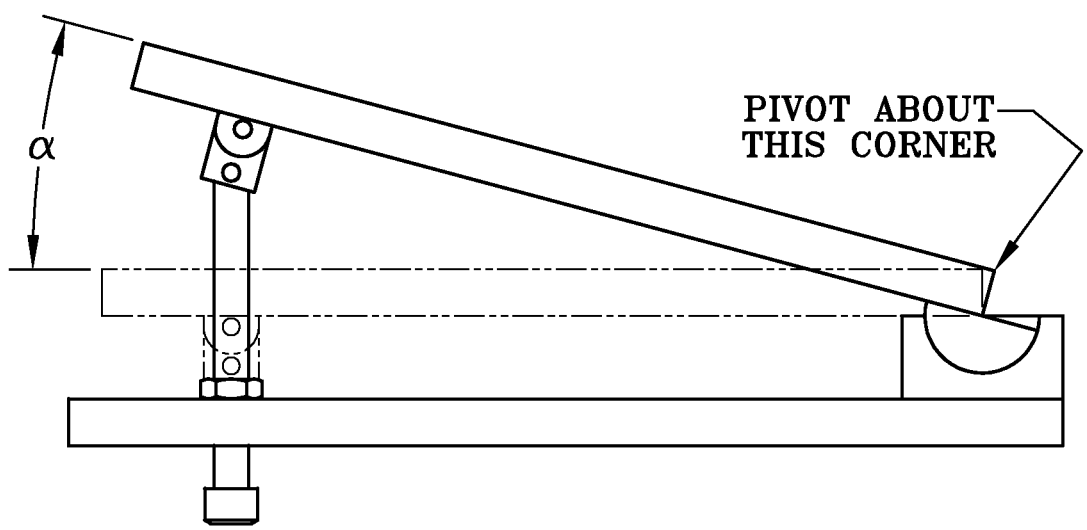
FIG. 24 is an alternate embodiment of an adjustable calibration block of the present invention.

As shown in FIG. 10, the first stage cutting system 144 is utilized to cut through only the gum layers of the laminate or gum/elastomer stock not containing ply. The cutting blade 160 may be an ultrasonic blade. As shown in FIGS. 22-23, the blade 160 is preferably wedge-shaped and has a flat cutting edge 162, wherein the entire cutting edge 162 is a node. As shown in FIG. 11, the blade 160 is mounted on a holder 170 that can adjust the skive angle $\alpha$, angle of attack $\beta$ as well as vertical and horizontal adjustments. The blade holder 170 is slidably mounted on a lower support bar 172 so that the blade 162 can traverse across the anvil lower surface 142 cutting the gum components of the laminate, from one side to the other. A pulley system, a ball screw or any other conventional translating means may be used to translate the blade holder and blade. A translation servo system 174 may be used to track the position of the blade across the width of the laminate. The speed of the translation may be preprogrammed into a controller (not shown) so that the speed can be varied across the width of the anvil.

The adjustment of the blade angles in relation to the cutting line is important to the success of the cut. As shown in FIG. 11, the leading edge 162 of the blade 160 is set at a desired skive angle $\alpha$ in relation to the plane of the gum surface of the laminate and the anvil lower surface. Thus after the cut has been made, the gum ends will have a skive angle $\alpha$. As shown in FIGS. 22-23, the leading edge of the blade 162 is also rotated about the longitudinal axis of the anvil an attack angle angle $\beta$ in the range of about 10 to about 60 degrees depending upon the thickness of the laminate stock, generally about 20-30 degrees.

In order to assist in the blade setup, a calibration block 180 may be utilized. The calibration block comprises a block having an angled calibration surface 182 wherein the flat edges 184 of the ultrasonic blade may be placed flush against the calibration surface in order to adjust the skive angle $\alpha$ and angle $\beta$ to the desired settings. The calibration surface may have angular notations on it for easy adjustment. The leading edge corner 162 of the blade 160 is aligned with the vertice of the angular markings on the surface of the calibration block. The alignment of the edge corner 186 of the blade with the vertice may be the system calibration point or "zero". The calibration block is preferably mounted adjacent to the end of the anvil assembly for ease of use. The calibration block may also be used as the "home" for the servosystem. Thus, the term "home" could include the blade settings of skive angle $\alpha$ and angle $\beta$, the x and y (gap height or distance from the blade to the anvil).

The blade also preferably has a height adjustment mechanism 161. The blade holder is mounted upon a servo driven vertical adjustment mechanism such as a linear actuator or ball screw and rail assembly 161 that allows the adjustment of the height of the blade (the distance between the blade and the anvil) as the blade traverses the width of the laminate stock. The height of the blade can be programmed to vary as the blade traverses the width of the ply. It is preferred that the height of the blade be adjusted slightly greater than the ply thickness as the blade approaches the ply edge, so that the blade does not snag a ply. After the leading edge of the blade has passed the leading edge of the ply, the blade height is preferably lowered closer to the surface of the laminate, so that the blade skims closely against the ply, removing all innerliner butyl or gum from the ply surface.

Ply Cutting System

After the gum components of the laminate have been skive cut, the secondary cutting system 146 for cutting the ply may be utilized. The second stage cutting system 146 includes a cutting mechanism 200 and a retractable pull down bar 300. The cutting mechanism 200 is mounted over the anvil on support rail 210 via support arm 212, on the ply side of the laminate. The cutting mechanism 200 further comprises a guide member 214 which is mounted parallel to the anvil. The cutting means 220 is a divided blade having two sides 222*a,b* which split apart after the cutting means is plunged through the center of the ply. Belts 224 traverse blades apart, cutting the ply. The invention is not limited to a split blade, as other cutting means such as a single knife may also be used. Blades 222 or cutting means 220 rest upon a hot plate preferably spring loaded and heated to a temperature suitable for cutting ply stock.

The cutting system 146 further comprises a retractable pull down bar 300. The pull down bar 300 is rotatably mounted to the anvil, wherein the bar is situated near the anvil leading edge surface as shown in FIG. 8*b*. The pull down bar may be actuated into engagement with the ply via hydraulic arm 310. The pull down bar functions to pull the ply away from the leading edge portion 150 and middle portion 152 of the lower surface of the anvil, leaving the ply only in contact with the rear portion 154 of the anvil. By pulling the ply away from the anvil in this manner, the skived gum component flap opens up, allowing the cutting means 220 to be in position to plunge through and cut only the ply. Tension of the ply can be adjusted by running the feed conveyor belt slightly forward before or during the pulldown of the ply to prevent excessive tension and stretching.

Method of Operation

Figure 8A:
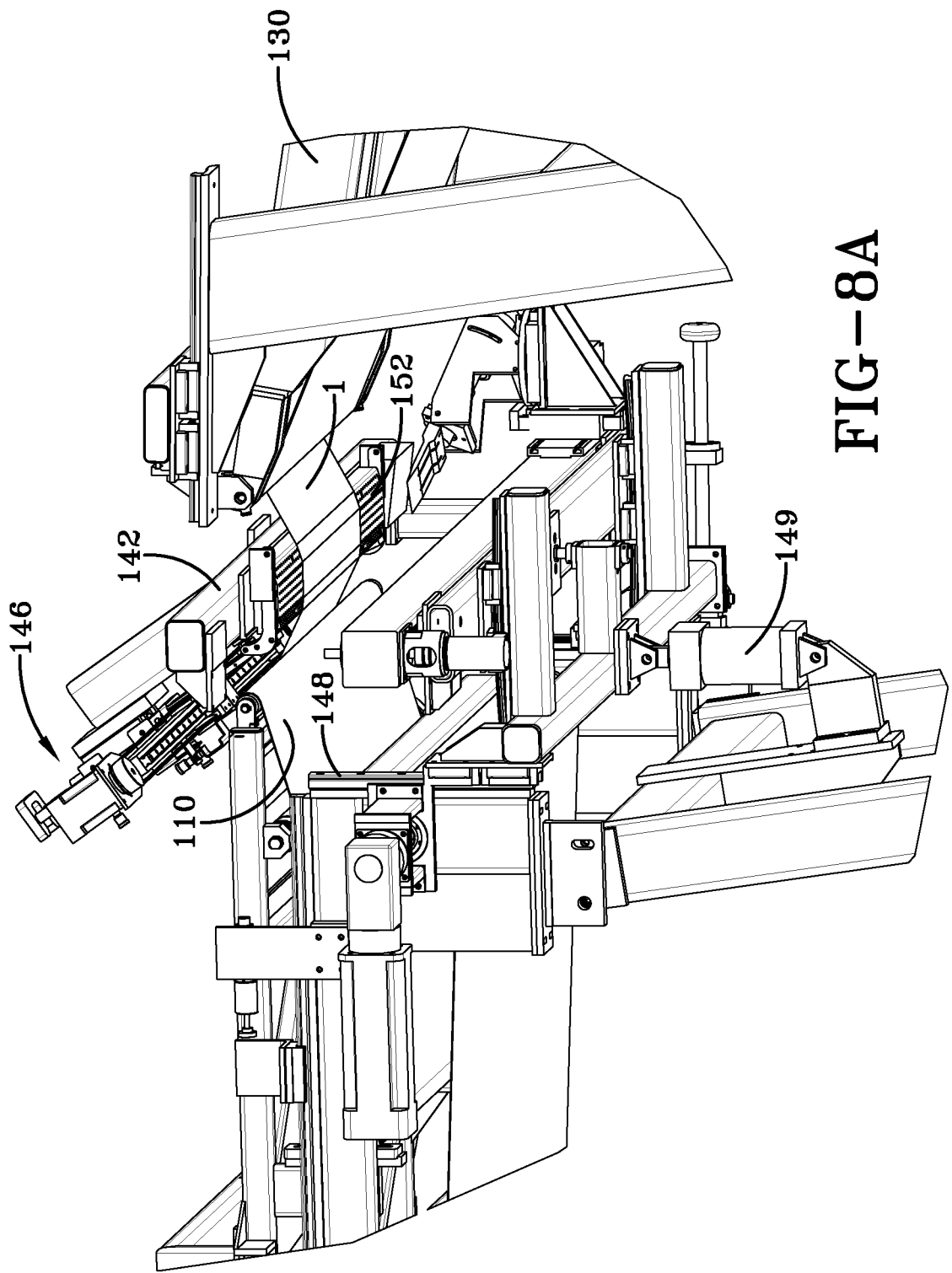

The operation of the cutting system of the present invention may now be described. The cutting system may cut laminate as described above, or conventional elastomer stock such as used in making tires. The laminate or stock 1 to be cut is typically mounted on a large roll onto a spindle adjacent the feed conveyor belt. The laminate is fed onto the conveyor belt so that the ply layer is face up and the gum layers are face down. The leading edge of the laminate is advanced forward onto the feed conveyor belt to the cut conveyor belt until the desired length is reached at the cutting edge of the anvil. Sensors mounted on or adjacent the cut conveyor belt detects when the desired length to be cut has been reached, so that the cutting line of the laminate is positioned on the cutting edge of the anvil. After the laminate has been positioned at the cutting edge of the anvil, the nose of the feed conveyor is translated away from the cutting line, and the anvil assembly is lowered until the laminate contacts the lower surface of the anvil. More preferably, the anvil assembly is lowered past the plane of the conveyor upper surface until the laminate is in slight tension, and the laminate wraps around the lower surfaces of the anvil, as shown in FIG. 8*a*. The anvil vacuum zones are turned on all three surfaces so that the laminate is held in place by the suction from the anvil surface. The suction, wrap and tension all function together to securely hold the laminate in place for the cut.

The cutting blade 160 is next traversed along the cutting edge of the anvil, cutting only through the gum layers at a desired angle $\alpha$, typically in the range of about 5 to about 45 degrees. The cutting blade edge may also be rotated away from the longitudinal axis of the anvil an angle of attack $\beta$, typically in the range of about 20 to about 45 degrees. The cutting blade is preferably an ultrasonic cutter with a bevel edged blade. The blade holder may be mounted on a linear actuator and servo system such as a linear screw (not shown)

and rail assembly 161 as shown in FIG. 11 that allows for vertical adjustment of the distance or gap between the blade and the anvil lower surface while the blade traverses across the width of the anvil. The vertical height adjustment allows for the varying thicknesses of the ply. The vertical height adjustment also allows the blade to have an increased gap just prior to the ply edge, and to decrease the gap after the blade passes the ply edge so that the cords are not inadvertently snagged.

The blade angle settings may be checked periodically to ensure the proper blade angles are maintained. A calibration block mounted near the anvil may be used to ensure the proper blade angles are set. The calibration block has an angled surface to match the desired angle of the anvil surface and to position the blade at the desired angle of attack $\beta$ and cutting angle $\alpha$. The blade is positioned adjacent the angled calibration surface of the calibration block. To adjust the cutting angle $\alpha$, the blade is adjusted until the leading edge of the blade is flush with the calibration block outer surface. To adjust the angle of attack $\beta$, the operator rotates the blade until the cutting surface of the blade is at the desired angle displayed on the face of the calibration block.

After the blade cutter has cut through the gum portion of the laminate at a skive angle $\alpha$, a flap of gum is formed. The tension in the laminate as well as the wrap of the laminate about the anvil ensures that the flap stays open and does not reseal.

If the laminate has a layer of ply, the next step it to cut through the ply layer with the plunge cutter where the ply is exposed underneath the flap. In order to accomplish this step, the laminate is first positioned for the secondary cut through the ply. In order to accomplish this, the vacuum is turned off in the leading edge section 150 and middle section 152 except for the rear section where the vacuum is turned on. Then the tension on the laminate is loosened by driving the feed conveyor belt forward slightly in the range typically of about 0.25 to about 1 inch. Next the pull down bar is actuated so that it pulls the laminate down and away from the anvil leading edge portion and the middle portion, while the laminate remains suctioned to the rear surface of the anvil. The pull down bar opens up the flap to provide clearance for the secondary plunge cutter. The laminate is now in position for the plunge cut. One advantage to using a pull down bar is that the laminate is moved away from the anvil so that the ply cords can "float" or move slightly during the cut. Another advantage of the pull down bar is that the skived flap of gum rubber is opened to provided adequate clearance for a plunging blade.

The ply cutting apparatus is then actuated so that the ply cutter plunges through the ply layer in the exposed ply adjacent the flap of gum (flap opening). The ply cutter preferably plunges from the ply side of the laminate, which reduces the possibility of damage to the flap of gum. Preferably the ply cutter is heated and is a two piece blade that makes the cut in the center of the ply. The two piece blade plunges into the ply and then separates into two blades. However, other blade configurations may also be used such as a single blade that traverses across the ply.

One way of heating the ply cutter is to utilize a heated block located on the apparatus. The heated block is made of conductive metal that is heated to a temperature in the range of about 550 to 600 Deg F. The base of the blade rests against the heated block. The base of the blade has to be heated to 550-600 degrees in order to drive the blade tip temperature to about 300 degrees. More preferably, a spring loaded hot plate is utilized, wherein the blade tip rests on the hot surface when not in use. The spring loaded hot plate surface is heated to about 300-350 degrees.

Figure 20A:
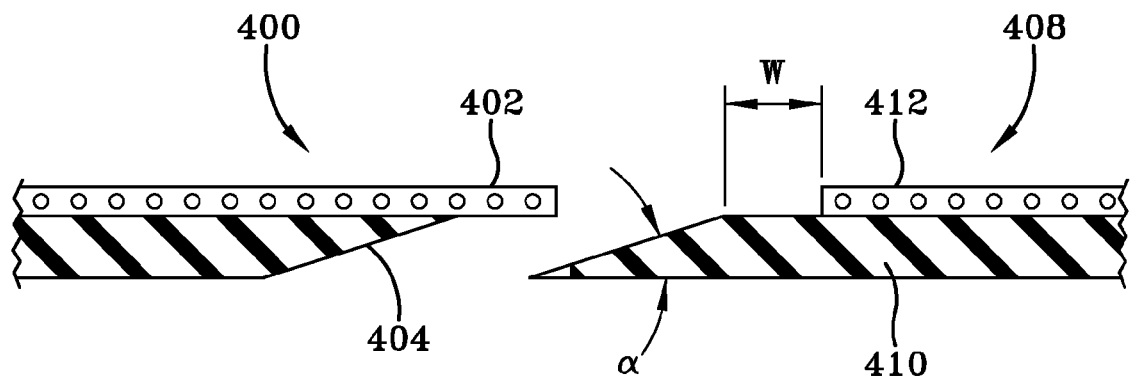
FIG. 20a is a side view of the cut ends of the laminate segment after the first and second stage cutting operation.
Figure 20B:
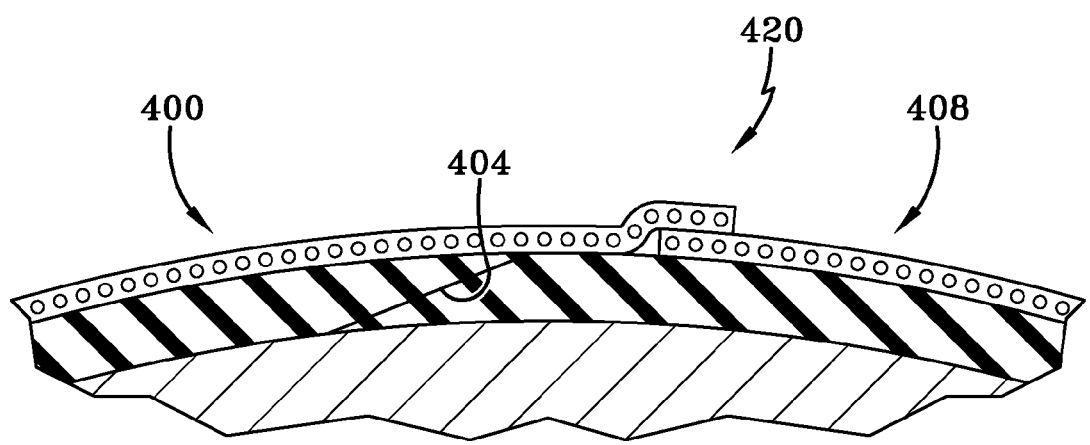
FIG. 20b is a side view of the cut ends of the laminate segment shown spliced together on a tire drum (partially shown)

After the laminate has been cut into a segment of a desired length, it may be transported to a tire building drum wherein the ends of the segment are spliced together as shown in FIGS. 20*a* and *b*. The cut ends of the laminate segment are shown in FIG. 20*a*. A first end 400 has skived gum layer 404 and an overhang of ply 402. The second end 408 of the segment has a skived gum layer 410 and an offset in the ply 412 from the free end 408, typically about a half of an inch. The ends 400 and 408 are then joined together forming an offset splice. The offset splice 420 is illustrated in FIG. 20*b*, wherein one or more cords overlap in forming the splice, and the skived ends of the gum layer are mated together, forming a strong splice. However, the splice may also be formed without any cord overlap.

While certain representative embodiments and details have been shown for the purpose of illustrating the invention, it will be appreciated there is still in the art various changes and modifications may be made therein without departing from the spirit or scope of the invention. For example, while the cutting method has been described in terms of the gum components down and the ply side up, one skilled in the art can recognize that the cutting could be accomplished with the gum components face up, ply down by reversing the orientation of the machinery.

What is claimed is:

1. An apparatus for cutting a strip of laminate containing one or more layers of gum and a layer of reinforcing cords, the apparatus comprising:
    a retractable conveyor belt for conveying the laminate to an anvil, wherein the conveyor belt has a first position and a retracted second position, said anvil is movable from a first position, to a second position wherein in the second position the laminate wraps around the anvil; the apparatus further comprises
        (a) a first cutting element inclined at a skive angle $\alpha$, the cutting element being positioned to cut through only the one or more layers of gum;
        (b) a second cutting element for cutting through the layer of reinforcing cords in a line tangent to the one or more cords; and
        (c) a pull down bar mounted onto the anvil for engagement with the laminate, wherein the pull down bar has a retracted position and an extended position, wherein in the extended position the pull down bar pulls the laminate away from a portion of the anvil.

2. The apparatus of claim 1 wherein the first cutting element has the cutting edge inclined at an acute angle $\beta$ relative to the width of the laminate.

3. The apparatus of claim 1 wherein the skive angle $\alpha$ is about 10° or less adjacent the one or more cords.

4. The apparatus of claim 1 wherein the first cutting element is an ultrasonic knife.

* * * * *